(12) United States Patent
Xie

(10) Patent No.: US 10,151,945 B2
(45) Date of Patent: Dec. 11, 2018

(54) TRANSPARENT DISPLAY DEVICE

(71) Applicant: Wuhan China Star Optoelectronics Technology Co., Ltd., Wuhan, Hubei (CN)

(72) Inventor: Chang Xie, Guangdong (CN)

(73) Assignee: Wuhan China Star Optoelectronics Technology Co., Ltd, Wuhan, Hubei (CN)

(*) Notice: Subject to any disclaimer, the term of this patent is extended or adjusted under 35 U.S.C. 154(b) by 270 days.

(21) Appl. No.: 15/112,415

(22) PCT Filed: Jun. 29, 2016

(86) PCT No.: PCT/CN2016/087671
§ 371 (c)(1),
(2) Date: Jul. 18, 2016

(87) PCT Pub. No.: WO2017/219379
PCT Pub. Date: Dec. 28, 2017

(65) Prior Publication Data
US 2018/0164632 A1    Jun. 14, 2018

(30) Foreign Application Priority Data

Jun. 20, 2016 (CN) .......................... 2016 1 0446066

(51) Int. Cl.
*G02F 1/1333* (2006.01)
*G02F 1/1335* (2006.01)
(Continued)

(52) U.S. Cl.
CPC ...... *G02F 1/133377* (2013.01); *G02F 1/1337* (2013.01); *G02F 1/13336* (2013.01); *G02F 1/133528* (2013.01); *G02F 1/1333* (2013.01); *G02F 1/1368* (2013.01); *G02F 1/133514* (2013.01); *G02F 2001/133531* (2013.01);
(Continued)

(58) Field of Classification Search
CPC ......... G02F 1/133377; G02F 1/133528; G02F 2001/133738; G02F 1/13336
See application file for complete search history.

(56) References Cited

U.S. PATENT DOCUMENTS

| 6,496,239 B2* | 12/2002 | Seiberle | G02B 5/3016 349/24 |
| 2013/0120688 A1* | 5/2013 | Chao | F21V 11/00 349/62 |
| 2013/0208216 A1* | 8/2013 | Hayano | G02F 1/133753 349/96 |

* cited by examiner

*Primary Examiner* — Dung Nguyen
(74) *Attorney, Agent, or Firm* — Andrew C. Cheng

(57) ABSTRACT

The invention provides a transparent display device including a lower polarizer, a first substrate, a liquid crystal layer, a second substrate and an upper polarizer sequentially stacked in that order. On a direction parallel to an image display plane of the transparent display device, the transparent display device includes multiple transparent areas and multiple display areas alternately arranged with the transparent areas. In the liquid crystal layer, each transparent area and the display area neighboring therewith have a partition plate disposed therebetween. The partition plate is connected between the first substrate and the second substrate and for separating liquid crystals corresponding to the transparent area and the display area. An initial direction of longitudinal axis of the liquid crystal in the transparent area is perpendicular to an initial direction of longitudinal axis of the liquid crystal in the display area.

10 Claims, 1 Drawing Sheet

(51) Int. Cl.
*G02F 1/1337* (2006.01)
*G02F 1/1368* (2006.01)
(52) U.S. Cl.
CPC ............ *G02F 2001/133738* (2013.01); *G02F 2203/01* (2013.01)

TRANSPARENT DISPLAY DEVICE

CROSS REFERENCE TO RELATED APPLICATION

This application claims the priority of Chinese Patent Application No. 201610446066.2, entitled "Transparent Display Device", filed on Jun. 20, 2016, the disclosure of which is incorporated herein by reference in its entirety.

FIELD OF THE INVENTION

The invention relates to the field of liquid crystal display technology, and particularly to a transparent display device.

BACKGROUND OF THE INVENTION

A transparent display device is a type of display device that itself has a certain degree of light penetration, can display information on a display screen thereof when a voltage is applied thereto, and a background behind a display image can be seen through the display screen when no voltage is applied thereto. Therefore, the transparent display device is suitable for building windows, car windows, shop windows and so on.

The transparent display device is divided into a transparent area (i.e., external light is transmissive) and a display area (RGB pixel area), and a commonly used display mode is IPS (In Plane Switching), FFS (Fringe Field Switching) or multi-domain VA (vertical Alignment), etc. In most of application scenarios, the transparent display device is required to be in a transparent state in most of time and thus does not display, and only when people need to watch a display image, it is required to perform a transparent display or non-transparent display. In the conventional display technology, the IPS mode and FFS mode have display quality advantages such as wide viewing angle and high contrast, however the transparent area of the transparent display device adopting the IPS mode or FFS mode would be in normally black mode, and the transparent area is maintained in a transparent state only when a voltage is applied onto the transparent area of the transparent display device. Accordingly, power consumption of the transparent display device is large and application range thereof is limited.

SUMMARY OF THE INVENTION

Accordingly, a technical problem to be solved by the invention is to provide a transparent display device which can reduce power consumption.

In order to achieve the above objective, embodiments of the invention provide technical solutions as follows.

A transparent display device includes a lower polarizer, a first substrate, a liquid crystal layer, a second substrate and an upper polarizer. On a direction parallel to an image display plane of the transparent display device, the transparent display device includes multiple (i.e., more than one) transparent areas and multiple display areas alternately arranged with the transparent areas. In the liquid crystal layer, each of the transparent areas and the display area neighboring therewith have a partition plate disposed therebetween. The partition plate is connected between the first substrate and the second substrate and for separating liquid crystals corresponding to the transparent area and the display area. An initial direction of longitudinal axis of the liquid crystal in the transparent area is substantially perpendicular to an initial direction of longitudinal axis of the liquid crystal in the display area.

In an embodiment, the initial direction of longitudinal axis of the liquid crystal in the transparent is horizontal direction, and the initial direction of longitudinal axis of the liquid crystal in the display area is vertical direction.

In an embodiment, the liquid crystal in the transparent area is a positive liquid crystal, and the liquid crystal in the display area is a negative liquid crystal.

In an embodiment, the partition plate is made of a transparent material.

In an embodiment, the partition plate is made of any one or more of polymers, resins and organic macromolecules.

In an embodiment, a surface of the first substrate facing towards the liquid crystal layer is disposed with a first electrode, a surface of the second substrate facing towards the liquid crystal layer is disposed with a second electrode, and the liquid crystal layer is located between the first electrode and the second electrode.

In an embodiment, the first substrate is an array substrate, and the second substrate is a color filter substrate.

In an embodiment, the first electrode is a pixel electrode, and the second electrode is a common electrode.

In an embodiment, the partition plate penetrates through the first electrode and the second electrode and is perpendicularly connected with the first substrate and the second substrate.

Sum up, the transparent display device according to the invention disposes the partition plate between neighboring transparent area and display area to separate liquid crystals in corresponding areas, and uses the liquid crystal of which the longitudinal axis is vertical in its initial state, so that can realize transparent display of the transparent area in the situation of the liquid crystal layer being not applied with a voltage, the requirement of consumers on the transparent display device that can be in a transparent state for a long time can be met, the power consumption is low and the purpose of energy saving is achieved.

BRIEF DESCRIPTION OF THE DRAWINGS

In order to more clearly illustrate technical solutions of embodiments of the invention, drawings will be used in the description of embodiments will be given a brief description below. Apparently, the drawings in the following description only are some of embodiments of the invention, the ordinary skill in the art can obtain other drawings according to these illustrated drawings without creative effort.

DETAILED DESCRIPTION OF THE PREFERRED EMBODIMENTS

In the following, with reference to accompanying drawings of embodiments of the invention, technical solutions in the embodiments of the invention will be clearly and completely described. Apparently, the embodiments of the invention described below only are a part of embodiments of the invention, but not all embodiments. Based on the described embodiments of the invention, all other embodiments obtained by ordinary skill in the art without creative effort belong to the scope of protection of the invention.

Figure 1:
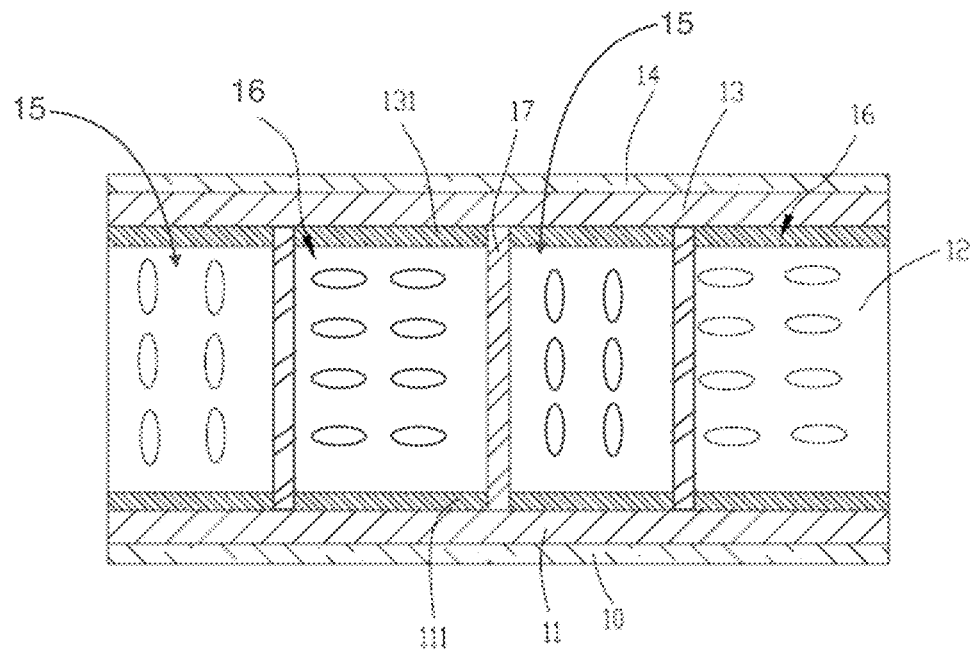
FIG. 1 is a schematic cross-sectional view of a transparent display device according to a preferred embodiment of the invention.

Referring to FIG. 1, the invention provides a transparent display device which is used for building windows, car windows, shop windows and so on to display images, and is transparent in a non-display state. The transparent display device includes a lower polarizer 10, a first substrate 11, a liquid crystal layer 12, a second substrate 13 and an upper polarizer 14 sequentially stacked in that order. The transparent display device includes multiple (i.e., more than one) transparent areas 15 and multiple display areas 16 alternately arranged with the transparent areas 15 on a direction parallel to an image display plane of the transparent display device. In the liquid crystal layer 12, each of the transparent areas 15 and the display area 16 neighboring therewith have a partition plate 17 disposed therebetween. The partition plate 17 is connected between the first substrate 11 and the second substrate 13 and for separating liquid crystals corresponding to the transparent area 15 and the display area 16. An initial direction of longitudinal axis of the liquid crystal in the transparent area 15 is perpendicular to an initial direction of longitudinal axis of the liquid crystal in the display area 16. In the drawing, a-axis is the longitudinal axis of liquid crystal.

In the illustrated embodiment, the first substrate 11 is an array substrate (e.g., well-known TFT array substrate), and the second substrate 13 is a color filter substrate. The lower polarizer 10 is stacked on a surface of the first substrate 11 facing away from the liquid crystal layer 12. The upper polarizer 14 is stacked on a surface of the second substrate 13 facing away from the liquid crystal layer 12, i.e., on the light output surface. The liquid crystal layer 12 is sealed between the first substrate 11 and the second substrate 13. A surface of the first substrate facing towards the liquid crystal layer 12 is disposed with a first electrode 111, a surface of the second substrate 13 facing towards the liquid crystal layer 12 is disposed with a second electrode 131, and the liquid crystal layer 12 is located between the first electrode 111 and the second electrode 131. In the illustrated embodiment, the first electrode 111 is a pixel electrode, and the second electrode 131 is a common electrode.

The transparent display device has multiple pixel units, i.e., the display areas 16, used for display an image. The transparent areas 15 are alternately arranged with the display areas 16. The partition plates 17 each penetrate through the first electrode 111 and the second electrode 131 to perpendicularly connect with the first substrate 11 and the second substrate 13. The partition plates 17 each in the liquid crystal layer 12 separate the liquid crystal corresponding to the display area 16 from the liquid crystal corresponding to the transparent area 15. The initial direction of longitudinal axis a of the liquid crystal in the transparent area 15 is horizontal direction, and the initial direction of longitudinal axis a of the liquid crystal in the display area 16 is vertical direction. It should be understood that, the liquid crystal in the transparent area 15 is a positive liquid crystal, and the liquid crystal in the display area 16 is a negative liquid crystal.

Furthermore, the partition plate 17 is made of a transparent material. The partition plate 17 for example is made of any one of a polymer, a resin and an organic macromolecule. The partition plate 17 does not affect the display of the display area.

When the liquid crystal layer is not applied with a voltage thereon, i.e., the transparent display device is in a transparent state of without displaying an image, as to the display area 16, since the liquid crystal material being used is a negative liquid crystal, an initial orientation direction is vertical alignment. As to the transparent area 15, since the liquid crystal material being used is a positive liquid crystal, an initial orientation direction is horizontal alignment. In the invention, the liquid crystal of the transparent area 15 in its initial state employs the horizontal alignment, liquid crystal molecules would cause phase retardation on light, so that the transparent area 15 is normally white mode, i.e., in the situation of being not applied with a voltage, light can pass through the transparent area. In other words, the transparent area 15 of the invention can realize a transparent state without the applying of a voltage in most application scenarios and most of time, and therefore the power consumption of the transparent display device is reduced, the purpose of energy saving is achieved, and endurance of the transparent electronic display apparatus is increased.

Figure 2:
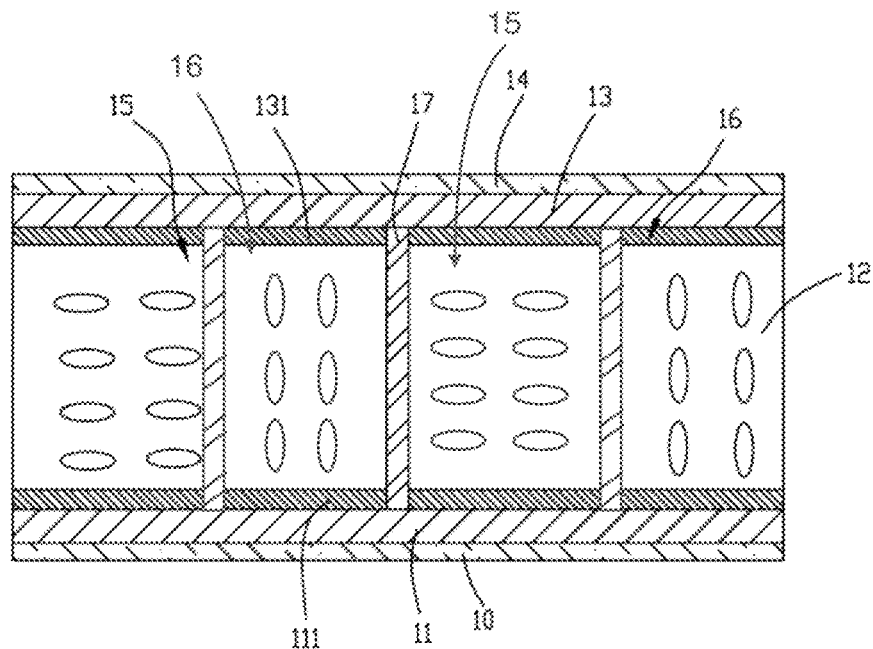
FIG. 2 is a schematic view of the transparent display device shown in FIG. 1 being applied with a voltage.

In addition, referring to FIG. 2, when a voltage is applied thereto, the liquid crystal in the transparent area 15 would change in direction, the liquid crystal molecules stand up, and at this time the liquid crystal molecules would not cause phase retardation on light, and the light cannot pass through the transparent area, the liquid crystal in the display area 16 is changed in direction for displaying, and the transparent area 15 displays a non-transparent state for assisting the display area 16 to display corresponding opaque image.

In summary, the transparent display device of the invention disposes the partition plate 17 between neighboring transparent area 15 and display area 16 for separating liquid crystals in corresponding areas and uses the liquid crystal of which the longitudinal axis in the initial state is vertical, so that it can realize the transparent display of the transparent area 15 in the condition of the liquid crystal layer being not applied with a voltage, and therefore can meet the requirement of consumers on the transparent display device that can be in a transparent state for a long time, the power consumption is low and the purpose of energy saving is achieved.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A transparent display device comprising a lower polarizer, a first substrate, a liquid crystal layer, a second substrate and an upper polarizer sequentially stacked in that order; wherein on a direction parallel to an image display plane of the transparent display device, the transparent display device comprises a plurality of transparent areas and a plurality of display areas alternately arranged with the plurality of transparent areas, and in the liquid crystal layer, each of the transparent areas and the display area neighboring therewith have a partition plate disposed therebetween, the partition plate is connected between the first substrate and the second substrate and for separating liquid crystals corresponding the transparent area and the display area, an initial direction of longitudinal axis of the liquid crystal in the transparent area is perpendicular to an initial direction of longitudinal axis of the liquid crystal in the display area.

2. The transparent display device as claimed in claim 1, wherein the initial direction of longitudinal axis of the liquid crystal in the transparent area is horizontal direction, and the initial direction of longitudinal axis of the liquid crystal in the display area is vertical direction.

3. The transparent display device as claimed in claim 2, wherein the liquid crystal in the transparent area is a positive liquid crystal, and the liquid crystal in the display area is a negative liquid crystal.

4. The transparent display device as claimed in claim 1, wherein the partition plate is made of a transparent material.

5. The transparent display device as claimed in claim 4, wherein the partition plate is made of any one or more of polymers, resins and organic macromolecules.

6. The transparent display device as claimed in claim 1, wherein the partition plate is made of any one or more of polymers, resins and organic macromolecules.

7. The transparent display device as claimed in claim 1, wherein a surface of the first substrate facing towards the liquid crystal layer is disposed with a first electrode, a surface of the second substrate facing towards the liquid crystal layer is disposed with a second electrode, and the liquid crystal layer is located between the first electrode and the second electrode.

8. The transparent display device as claimed in claim 7, wherein the first substrate is an array substrate, and the second substrate is a color filter substrate.

9. The transparent display device as claimed in claim 7, wherein the first electrode is a pixel electrode, and the second electrode is a common electrode.

10. The transparent display device as claimed in claim 7, wherein the partition plate penetrates through the first electrode and the second electrode and is perpendicularly connected with the first substrate and the second substrate.

* * * * *